UNITED STATES PATENT OFFICE.

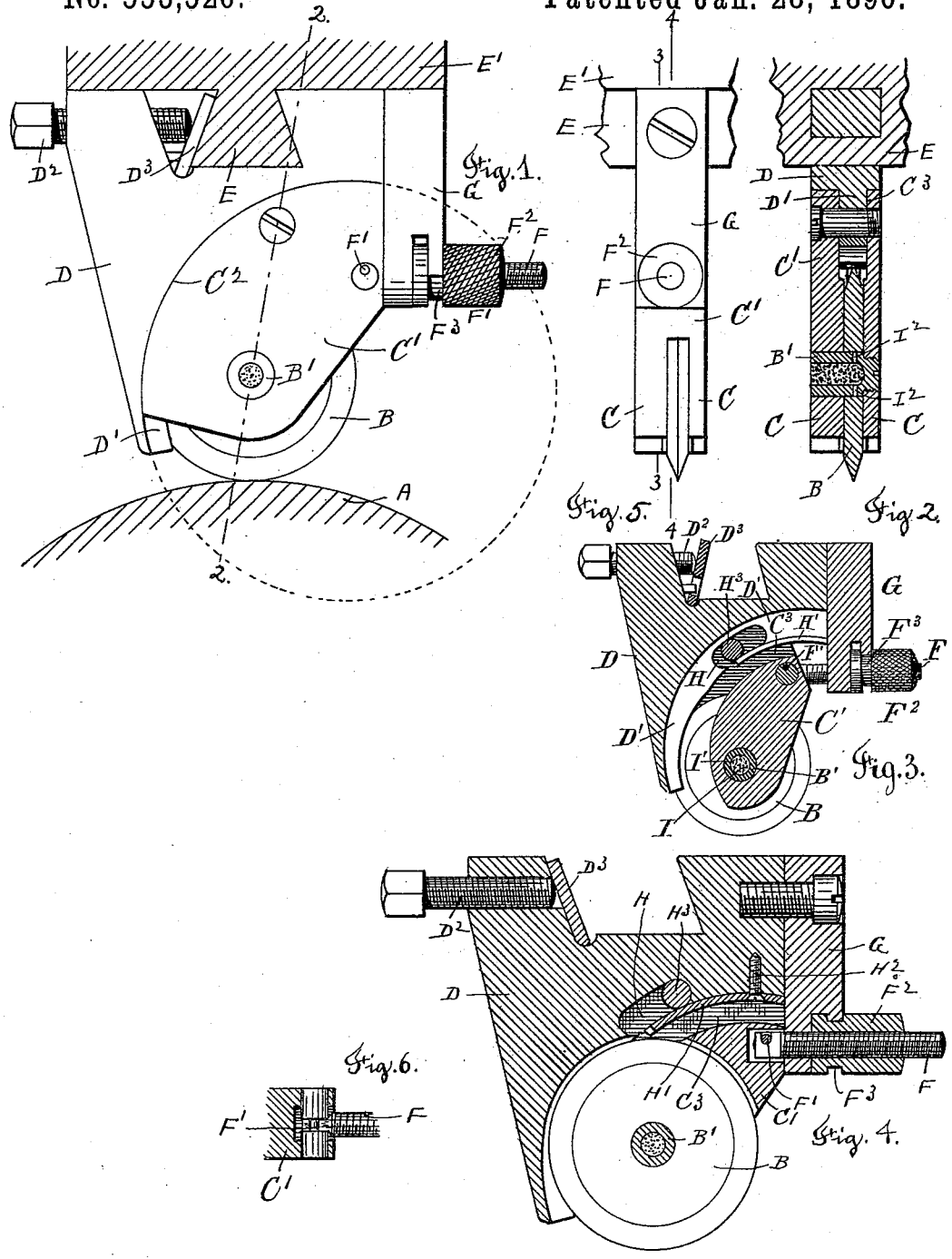

CLARENCE W. HOBBS, OF WORCESTER, MASSACHUSETTS.

ADJUSTABLE CUTTER FOR CUTTING CARDBOARD.

SPECIFICATION forming part of Letters Patent No. 553,526, dated January 28, 1896.

Application filed September 14, 1894. Serial No. 523,313. (No model.)

*To all whom it may concern:*

Be it known that I, CLARENCE W. HOBBS, a citizen of the United States, residing at Worcester, in the county of Worcester and State of Massachusetts, have invented a new and useful Improvement in Adjustable Cutters for Cutting Cardboard, of which the following is a specification, accompanied by drawings representing an adjustable cutter embodying my invention and forming a part of the specification.

My invention has for its object to provide means for supporting and adjusting the rotating or wheel cutters which are commonly employed in the machines now in common use for cutting or scoring cardboard in the manufacture of paper boxes and for other purposes; and my invention consists in the construction and arrangement of the several parts, as hereinafter described and pointed out in the annexed claims.

In the accompanying drawings I have represented so much of a cutting or scoring machine as is necessary in order to fully set forth the nature and method of operation of my improvement.

Figure 1 represents one of my improved cutters supported by a cutter-bar, and shown in its relation to a co-operating roller by which the cardboard is held against the cutting-edge of the rotating cutter. Fig. 2 is a sectional view on line 2 2, Fig. 1. Fig. 3 is a central sectional view on line 3 3, Fig. 5. Fig. 4 is a sectional view on line 4 4, Fig. 5. Fig. 5 is an edge view; and Fig. 6 represents a portion of the screw F, showing its attachment to the cutter-carrying frame C'.

Similar letters refer to similar parts in the different figures.

In the accompanying drawings, A denotes the roller and B the rotating cutter journaled on a spindle B', which is held in the sides C C of a frame C'. The frame C' consists of a plate slotted in its central section to receive the rotating cutter B and forming the sides C C in which the spindle B' is held. The frame C' is provided with a circular side $C^2$, provided with a slot $C^3$ inclosing a rib D' on a block D, adjustably clamped upon a dovetailed projection E on the under side of the bar E' by means of a clamping-screw $D^2$ having its end pressing against a gib $D^3$. The block D is capable of adjustment along the bar E' in order to allow the rotating cutter to be set in any desired position. The frame C' is capable of a sliding motion in the arc of a circle moving on the rib D'.

Near the upper end of the frame C' is pivoted a screw F by a pin F', allowing a slight angular movement of the screw upon its pivotal pin. The screw F carries a nut $F^2$ provided with a milled head and a neck or annular groove $F^3$. The annular groove $F^3$ is engaged by the end of a bar G, which is attached to the edge of the block D, so as to hold the nut from longitudinal movement. The circular rib D' is recessed at H, and the recess is closed by an elastic strip H', which is held against the edge of the circular rib D' by a screw $H^2$ near one end of the elastic strip, and a pin $H^3$ carried by the frame C' passes through the recess H and is held in place by the elastic strip H'. The strip H' is made elastic in order to obviate the necessity of an accurate fit of the pin $H^3$, which serves to retain the frame C' in position on the rib D'.

The rotation of the nut $F^2$ will cause the screw F to be moved longitudinally, moving the frame C' along the circular rib D' and raising or lowering the rotating cutter according to the direction in which the nut is turned. As the screw F must be moved longitudinally by the rotation of the nut to effect the vertical adjustment of the rotating cutter, the nut $F^2$ and bar G also serve to hold the frame C in any desired position.

In the operation of the machine the upward pressure exerted upon the cutter is largely received by the circular rib D' and block D, forming a solid support for the frame C'.

The spindle B' is made hollow, forming a chamber I, and is filled with fibrous material I' saturated with oil, causing the cutter B to be thoroughly lubricated for a long period by the passage of the oil from the interior of the spindle to its exterior surface through small openings $I^2$. The circular side $C^2$ forms an arc of about ninety degrees, and when the cutter B is held in its highest position, as represented in Fig. 1, the horizontal plane containing the axis of the cutter will cut the circular arc at a point tangential to a vertical line, so that the longitudinal movement of the screw F in a horizontal plane will produce a vertical adjustment of the axis of the cutter in an arc nearly corresponding to a vertical plane. I do not, however, confine myself to the curved form of the rib D', as obviously other forms of track could be employed—as, for example, the rib D' could be straight and placed at an angle of forty-five degrees to a vertical line; but the movement of the frame C' upon such a track would of course slightly vary the position of the cutter relatively to the roller A. The advantage of a solid bearing of the frame C' against the block D would be secured by an oblique straight line.

What I claim as my invention, and desire to secure by Letters Patent, is—

1. The combination with a cutter bar, of a cardboard cutting machine, of a block D attached to said bar and provided with a rib D' in the form of a circular arc, a frame C' having a circular side provided with a slot inclosing said rib, a spindle held in said frame and near one end thereof, a rotating cutter journaled on said spindle, a screw F pivotally connected to the opposite end of said frame, a rotating nut carried upon said screw and held from longitudinal movement, whereby the rotation of said nut will impart a longitudinal movement to said screw in a horizontal plane and move the frame C' along said circular rib, thereby imparting a vertical movement to said cutter, substantially as described.

2. The combination of block D having a rib D' provided with a recess H, an elastic strip H' closing said recess, cutter frame C' provided with a slot $C^3$ inclosing said rib, a cutter carried by said frame, a pin $H^3$ held by said frame and passing through the recess in said rib D', substantially as described.

Dated this 4th day of July, 1894.

CLARENCE W. HOBBS.

Witnesses:
RUFUS B. FOWLER,
EMMA KESTER.